United States Patent
Gossner

(10) Patent No.: US 9,797,758 B2
(45) Date of Patent: Oct. 24, 2017

(54) METHOD FOR OPERATING A VORTEX FLOWMETER DEVICE

(71) Applicant: KROHNE Messtechnik GmbH, Duisburg (DE)

(72) Inventor: Kai Gossner, Neukirchen-Vluyn (DE)

(73) Assignee: KROHNE Messtechnik GmbH, Duisburg (DE)

( * ) Notice: Subject to any disclaimer, the term of this patent is extended or adjusted under 35 U.S.C. 154(b) by 736 days.

(21) Appl. No.: 13/633,327

(22) Filed: Oct. 2, 2012

(65) Prior Publication Data
US 2013/0103325 A1   Apr. 25, 2013

(30) Foreign Application Priority Data
Oct. 19, 2011   (DE) .................. 10 2011 116 282

(51) Int. Cl.
*G01F 1/32*   (2006.01)
(52) U.S. Cl.
CPC ............ *G01F 1/3263* (2013.01); *G01F 1/329* (2013.01); *G01F 1/3209* (2013.01)
(58) Field of Classification Search
CPC ............ G01F 1/36; G06F 19/00; F01F 25/00
USPC ........................................................ 702/47
See application file for complete search history.

(56) References Cited

U.S. PATENT DOCUMENTS

| 3,886,794 A | 6/1975 | McShane |
| 4,592,240 A | 6/1986 | McHale et al. |
| 4,907,459 A | 3/1990 | Tada et al. |
| 5,289,726 A | 3/1994 | Miau et al. |
| 8,024,136 B2 | 9/2011 | Jezernik et al. |
| 2007/0119263 A1* | 5/2007 | Henry et al. ............ 73/861.356 |
| 2011/0103625 A1* | 5/2011 | Srinivasan et al. ........... 381/312 |

FOREIGN PATENT DOCUMENTS

| CA | 892698 | | 2/1972 |
| GB | 2 061 505 A | | 5/1981 |
| WO | 90/04230 A1 | | 4/1990 |
| WO | WO 9004230 | * | 4/1990 |

OTHER PUBLICATIONS

Lee et al., "Variability and Correlated Noise in the Discharge of Neurons in Motor and Parietal Areas of the Primate Cortex", J. of Neuroscience, 18(3) (1998) 1161-1170.*

* cited by examiner

*Primary Examiner* — Mohamed Charioui
*Assistant Examiner* — Catherine Rastovski
(74) *Attorney, Agent, or Firm* — David S. Safran

(57) ABSTRACT

Method for operating a vortex flowmeter device for measuring the flow of a fluid that flows through a measuring tube in which a baffle is arranged for producing eddies in the fluid. A signal-processing device processes signals of first and sensors produced by pressure fluctuations. A first signal is obtained by multiplication of the signal of the first sensor with a correction factor, and the second signal is obtained by multiplication of the signal of the second sensor with another correction factor such that a wanted signal is obtained from the deviation between the first signal and second signals, and a sum signal is formed from the sum of the first and second signals. A correlation between the wanted signal and the sum signal is determined and the correlation is minimized by variation of the correction factors, whereby same-phase interfering signals superimposed on anti-phase sensor signals are at least minimized.

10 Claims, 3 Drawing Sheets

METHOD FOR OPERATING A VORTEX FLOWMETER DEVICE

BACKGROUND OF THE INVENTION

Field of the Invention

The invention relates to a method for operating a vortex flowmeter device for measuring the flow of a fluid that flows through a measuring tube, with at least one baffle arranged in the measuring tube for producing eddies in the fluid, at least one first sensor and at least one second sensor for measuring the pressure fluctuations in the fluid that accompany the eddies, and with a signal-processing device for processing the signals $x_1$ of the first sensor and the signals $x_2$ of the second sensor, whereby the signals $x_1$ of the first sensor produced by the pressure fluctuations are in phase opposition to the signals $x_2$ of the second sensor produced by the pressure fluctuations, whereby a wanted signal $y_d$ reproducing the flow is the deviation from a first signal $y_1$ derived from the signal of the first sensor and from a second signal $y_2$ derived from the signal of the second sensor, and whereby the same-phase interfering signals superimposed on the anti-phase sensor signals are eliminated by subtraction. Moreover, the invention also relates to a vortex flowmeter device, which is operated with the above-mentioned method.

Description of Related Art

The measuring principle of vortex flowmeter devices is based on eddies that are generated by baffles arranged in the measuring tube and around which fluid flows. The fluid can be a gas, vapor or a liquid. Strouhal was the first to observe that the eddy generation frequency is proportional to the flow rate of the fluid in the measuring tube, and thus, the eddy-generation frequency is a measure of the flow through the measuring tube expressed in terms of volume flow. Using the density of the fluid, flow can also be indicated as a mass flow rate. The flow field of the fluid produced by the baffle was investigated by Kármán and described mathematically, and thus, the flow field is also referred to as a Kármánic vortex path. The proportional dependency between the flow rate and the eddy generating frequency is described by the Strouhal number that is dependent upon the Reynolds number. The dependency of the Strouhal number on the Reynolds number is considerably influenced by the configuration of the baffle. In current vortex flowmeter devices, the error relative to the volume flow for fluids with a Reynolds number of between 10,000 and 20,000 is less than ±2% and for fluids with a Reynolds number of greater than 20,000 is less than ±1%. Vortex flowmeter devices are distinguished by a mechanically sturdy design and low sensitivity to wear and tear, corrosion and deposits. They can measure gases and vapors as well as liquids with Reynolds numbers over a wide range independently of pressure and temperature with good accuracy and independently of the installation position. Because of the above-mentioned properties, vortex flowmeter devices are used in a number of applications for flow-metering of fluids, in particular aggressive fluids, for example, in the petrochemical, chemical, pharmaceutical or food industry.

Vortex flowmeter devices that are known from the state of the art measure the eddy frequency for pressure fluctuations in the flowing fluid, accompanying the eddies, usually indirectly via the measurement of variations of pressure in the flowing fluid effected by the eddies. Often, the baffles are configured in such a way that the pressure changes exert a force on the baffle and correspondingly deflect or deform the baffle, whereby a first and a second piezoelectric sensor are arranged on the deformation spots. A mechanical excitation of sensors by a deformation caused by a pressure fluctuation produces a change in the polarization of the sensors and thus releases charge carriers in the sensors in such a way that by the mechanical excitation, the first sensor has a positive charge as a signal, and the second sensor has a negative charge as a signal. The sensitivity of a piezoelectric sensor is described by the charge that will develop as a function of the acting forces. In pressure fluctuations caused by eddies, the phase positions are always opposite to the charge signals of the sensors. For either of the two sensors, the signal processing comprises a charge amplifier and a subtractor, whereby the charge amplifiers convert the charge signals into proportional voltage signals and the subtractor subtracts the voltage signals from one another, and the flow is derived from the resulting useful-voltage signal.

By forming the deviation of the signal of the first sensor and the signal of the second sensor, the mechanical interfering excitations that generate interfering signals of the same phase position and the same amplitude in the sensors are eliminated if both sensors have the exact same sensitivity, and the signal processing for both sensors is exactly symmetrical. The mechanical interfering excitations are produced by, for example, turbines, which transfer interfering oscillations to the measuring tube, and in this way, the sensors produce mechanical excitations such that both sensors produce signals of the same phase position and the same amplitude to a very large extent.

Because of manufacturing tolerances—for example, of the sensors themselves or in the design of the sensors—the first sensor and the second sensor have different sensitivities, interfering oscillations of the same phase position and the same amplitude can, however, generate signals—specifically with the same phase position, but different amplitude— in the sensors. In addition, the signal processing, for example, by tolerances of the components used in the signal processing, such as condensers and resistors, is not symmetrical for the signals of the first and second sensors. After the forming of the deviation, an interfering signal remains in the wanted signal and impairs the accuracy of the generic vortex flowmeter devices. Calibration by trimming the sensors is associated with high costs and great expense. Aside from this, the long-term stability of the sensitivity is unknown, so that optionally impractical calibration in the installed state is necessary.

SUMMARY OF THE INVENTION

The primary object of this invention is, therefore, to provide an efficient and economical method for improved elimination of the effect of interfering signals of the same phase position, and in particular, the same amplitude and the indication of a corresponding generic vortex flowmeter device.

The method for operation of a vortex flowmeter device according to the invention, in which the previously deduced and indicated object is achieved, is first and foremost characterized in that the first signal $y_1$ is obtained by multiplication of the signal $x_1$ of the first sensor with a correction factor $v$, and the second signal $y_2$ is obtained by multiplication of the signal $x_2$ of the second sensor with a correction factor $w$, such that the wanted signal $y_d$ is obtained from the deviation between the first signal $y_1$ and the second signal $y_2$, and a sum signal $y_s$ is formed from the sum of the first signal $y_1$ and the second signal $y_2$, such that the correlation between the wanted signal $y_d$ and the sum signal $y_s$ is determined and such that the correlation by variation of the correction factors $v$ and $w$ is minimized, whereby the minimum correlation means a minimum content of the wanted signal $y_d$ on same-phase interfering signals.

The improved elimination of the effect of interfering signals of the same phase position, and in particular, also the same amplitude is carried out by compensation of the different sensitivities of the sensors by multiplication of the signal $x_1$ of the first sensor with the correction factor v and by multiplication of the signal $x_2$ of the second sensor with the correction factor w. As an indicator of the values of the correction factors, the correlation of wanted signal $y_d$ and sum signal $y_s$ is used. Both the multiplication with the correction factors v and w as well as the determination of the correlation are implemented in the signal processing device. If, for example, the signals have opposite phase positions and different amplitudes, the sum signal $y_s$ is different from zero, and the wanted signal $y_d$ and the sum signal $y_s$ are correlated with one another.

By variation of the correction factors v and w, the sum signal $y_s$ fades away and with the latter, also the correlation of the wanted signal $y_d$ and the sum signal $y_s$. The target in the variation of the correction factors v and w is accordingly a minimization of the correlation, and in the ideal case, a non-correlation of the wanted signal $y_d$ and the sum signal $y_s$. If the signals of the sensors have interfering signals of the same phase position, and in particular, the same amplitude, the minimization of the correlation runs to an at least improved elimination of the interfering signals, whereby the method also results in an improved elimination of the interfering signals with different amplitudes of the same-phase interfering signals.

The essential advantage of the method according to the invention is that the method can be implemented at only slight expense in existing generic vortex flowmeter devices and that an expensive and cost-intensive calibration is not necessary; rather, the method can be applied continuously. The method can also compensate for slow changes, such as, for example, a different drift of the sensitivities of the sensors, or adaptively match the sensitivities of the sensors to interfering signals.

According to a preferred configuration of the method according to the invention, it is provided that either the value 1 is assigned to the correction factor v and the value of the correction factor w is varied or that the value 1 is assigned to the correction factor w and the value of the correction factor v is varied. Based on the value assigned to it, a correction factor can amplify the signal of a sensor; the value of the correction factor will then be greater than 1 or it can damp the signal of the sensor; the value of the correction factor is then less than 1, or the signal of the sensor can be left unchanged; the value of the correction factor is then equal to 1. If the value of a correction factor is constantly 1, the implementation of the multiplication of the signal of the sensor by the correction factor in the signal processing device is thus virtually unnecessary, by which the signal processing device is simplified.

In a quite especially preferred configuration of the method according to the invention, it is provided that a correction factor k substitutes both the correction factor v and the correction factor w by v=k and w=1−k. In this case, values from the closed interval [0; 1] can be assigned to the correction factor k from the signal processing device. By the substituting of the two correction factors v and w by the one correction factor k, finding the minimum correlation between the wanted signal $y_d$ and sum signal $y_s$ is simplified, without impairing the quality of the method.

In another preferred configuration of the method, the signal processing takes place in a time-discrete manner, and the correlation between the wanted signal $x_d$ and the sum signal $x_s$ is determined by the correlation factor $$\rho[n] = \frac{Y_{ds}[n]}{\sqrt{Y_d[n]Y_s[n]}}$$

with $$Y_{ds}[n] = \sum_{i=1}^{n} y_d[i]y_s[i],$$

$$Y_d[n] = \sum_{i=1}^{n} y_d^2[i]$$

and $$Y_s[n] = \sum_{i=1}^{n} y_s^2[i]$$

with
wherein n is the number of the current measurement. The voltage signal of the first sensor and the voltage signal of the second sensor are digitized directly with analog-digital converters, and the signal processing is carried out in the digital portion of the signal processing device by a microcontroller. By signal processing that is essentially carried out in the microcontroller, it is possible, in a simple way, to make changes to the signal processing by re-programming.

The calculation of the correlation factor ρ is quite especially preferably carried out according to the formula $$\rho[n] = \frac{Y_{ds}[n]}{\sqrt{Y_d[n]Y_s[n]}}$$

with $$Y_{ds}[n] = (1-c)Y_{ds}[n-1] + cy_d[n]y_s[n],$$

$$Y_d[n] = (1-c)Y_d[n-1] + cy_d^2[n],$$

and $$Y_s[n] = (1-c)Y_s[n-1] + cy_s^2[n],$$

wherein c is time. The advantage of the calculation of the correlation factor with the above-mentioned formula relative to the formula from the previously mentioned preferred configuration is a significantly reduced computing expense. Because of the reduced computing expense, it is simple to implement the method according to the invention in existing vortex flowmeter devices with comparatively low processing power.

In another quite especially advantageous configuration of the method according to the invention, it is provided that the minimum correlation accompanied by a best-possible elimination of same-phase interfering signals is determined in a control circuit, which is part of the signal processing. The control circuit comprises a signal calculator, a correlation calculator, a difference calculator, and a proportional-integral (PI) regulator. The signal calculator, calculates both the wanted signal $y_d$ as well as the sum signal $y_s$. The correlation calculator, calculates from the wanted signal $y_d$ and the sum signal $y_s$, the actual correlation and the deviation former subtracts the actual correlation from the target correlation, whereby the target correlation is the non-correlation. The deviation between the target correlation and the actual correlation is the system deviation and thus the initial value of the regulator, which varies the correction factor k that is used as a control value.

The invention also relates to a generic vortex flowmeter device that is thus equipped with the above-mentioned features, in particular, with a signal processing device, whereby the signal processing system is set up in such a way that the previously described method according to the invention can be implemented with it, and during operation, it also embodies the described method according to the invention.

In a preferred configuration of the invention, the voltage signal of the first sensor is digitized directly after an anti-alias filtering, and the voltage signal of the second sensor is digitized after an anti-alias filtering, so that a linkage of the signals in the digital domain is carried out.

In particular, there are now different options to configure and further develop the method according to the invention for operation of a vortex flowmeter device and the vortex flowmeter device according to the invention. To this end, reference is made to the description of a preferred embodiment in connection with the accompanying drawings.

DETAILED DESCRIPTION OF THE INVENTION

Figure 1:
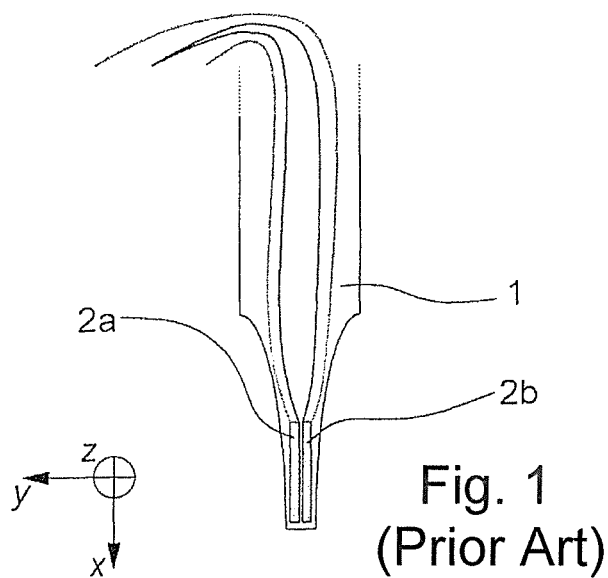
FIG. 1 is diagrammatic sectional view of a baffle that is known from the state of the art with first and second piezoelectric sensors.

FIG. 1 shows an overview of a baffle 1 that is known from the state of the art arranged in a measuring tube so that a fluid flows around the baffle 1 in a positive x-direction. In the tapered area of the baffle 1, eddies in the fluid that are caused by the baffle 1 and are generated by it produce pressure fluctuations, which exert forces on the baffle 1 along the y-axis in the tapered area of the baffle 1. These forces result in deviations or deformations of the baffle 1. In the area of the deformations, a first piezoelectric sensor 2a and a second piezoelectric sensor 2b are connected to the baffle 1; consequently, the piezoelectric sensors 2 are exposed to mechanical voltages. The mechanical voltages change the polarization of the sensors 2 by which, with reference to FIG. 7, an electrical charge $q_1$ is produced on the first sensor 2a as a signal and an electrical charge $q_2$ is produced on the second sensor 2b as a signal. The charge amount is a measure of the acting force. The sensors 2a, 2b are configured and arranged on the baffle 1 in such a way that the polarity of the charge $q_1$ that results from a force along the y-axis on the first sensor 2a is opposite to the polarity of the charge $q_2$ that results from the force on the second sensor 2b, whereby the polarities of the charges $q_1$ and $q_2$ are the same at forces that act along the x- or y-axis. In an alternative embodiment, the sensors are not connected to the baffle, but rather to a paddle that is arranged behind the baffle in the direction of flow.

Figure 7:
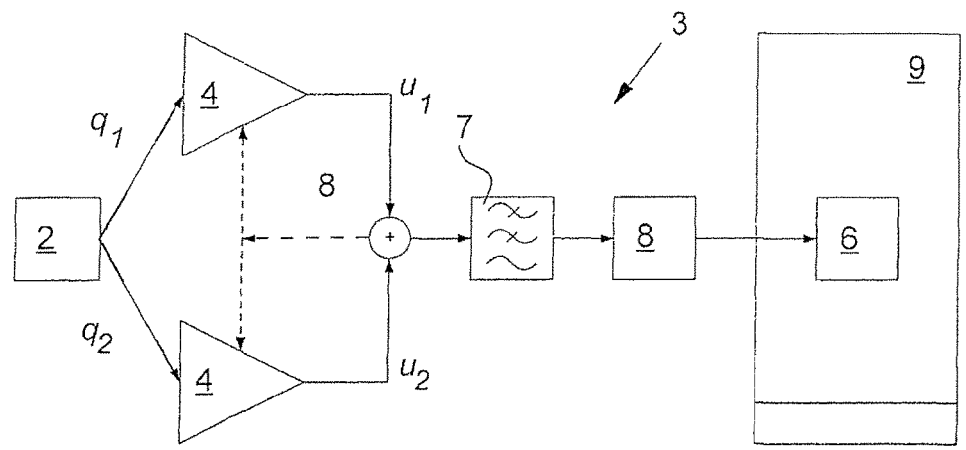
FIG. 7 shows an embodiment, depicted as a block diagram, of a signal processing that is known from the state of the art.

FIG. 7 shows a signal processing device 3 that is known from the state of the art. The charges $q_1$ and $q_2$ that are produced on the piezoelectric sensors 2 are converted by charge amplifiers 4 into signal voltages to and $u_2$ that are proportional to the charges $q_1$, $q_2$. The signal voltages $u_1$ and $u_2$ are subtracted by a subtractor 5 (FIGS. 2 & 3), and the resulting differential voltage $u_d = u_1 - u_2$ is a wanted signal voltage, which is a measure of the flow. Before the digitization of the wanted signal voltage $u_d$ in an analog-digital converter 6, the wanted signal voltage $u_d$ is conditioned. On the one hand, the wanted signal voltage $u_d$ is filtered with a low-pass filter 7 to avoid alias effects, and, on the other hand, the zero-point voltage of the wanted signal voltage $u_d$ is set in a preloading device 8, so that the modulation range of the analog-digital converter 6 is exploited as much as possible. The analog-digital converter 6 is a component of a microcontroller 9, in which the further processing of the digitized voltage signal $u_d$, which is $x_d$, is carried out.

Figure 2:
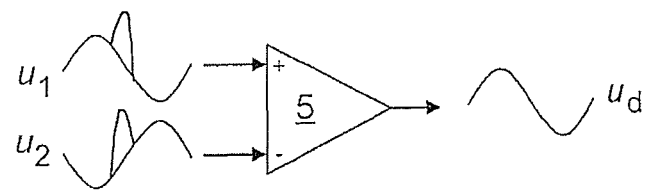
FIG. 2 is a symbolic depiction of the determination of a wanted signal from voltage signals caused by a mechanical excitation of first and second sensors of the same sensitivity, by the signal processing of FIG. 7.

If the first sensor 2a and the second sensor 2b have equally high sensitivities, the mechanical excitation of the baffle 1 that is caused by the eddy produces charges $q_1 = q$ and $q_2 = -q$ that are equally high in terms of value on the piezoelectric sensors with opposite polarities. The charges $q_1$, $q_2$ are converted from the charger amplifiers 4 into the voltages $u_1$, $u_2$, which are the same both in terms of antiphase and value. An additional mechanical excitation in the z-direction, produced, for example, by vibrations, produces a superposition of the signal voltages $u_1$, $u_2$ with same-phase interfering signals, whereby the values of the interfering signals in the two sensors 2 are equally large. FIG. 2 shows a corresponding example. By forming the wanted signal voltage $u_d$ by subtraction of the signal voltages $u_1$ and $u_2$ from one another, the same-phase interfering signals of the same value are completely eliminated. If the values of the same-phase interfering signals are different, the same-phase interfering signals are at least reduced.

Figure 3:
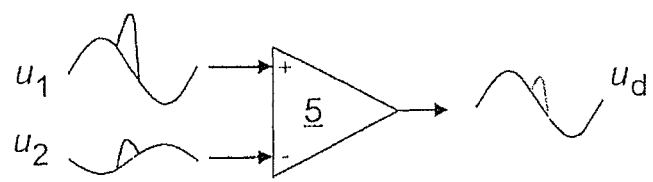
FIG. 3 is a symbolic depiction of the determination of a wanted signal from the voltage signals caused by the mechanical excitation of first and second sensors of different sensitivities, by the signal processing of FIG. 7.

Actually, the first sensor 2a and the second sensor 2b, however, have different sensitivities. Possible causes lie in the piezoelectric materials of the sensors 2 themselves or are produced by unavoidable low tolerances in the arrangement of the sensors 2 on the baffle 1. FIG. 3 shows the signal voltages $u_1$, $u_2$ in the same mechanical excitation of the baffle 1 as in the case described based on FIG. 2; here, only the sensitivity of the second sensor 2b is lower than the sensitivity of the first sensor 2a. By the different sensitivities of the sensors 2, the same-phase interfering signals are not completely eliminated and reduce the quality of the wanted signal voltage $u_d$ that indicates the flow. Both trimming of the two sensors 2 themselves, so that the sensitivity of the sensors 2 is equal, and a calibration of the vortex flowmeter device are associated with high effort and accompanying high costs and are therefore impractical.

Figure 4:
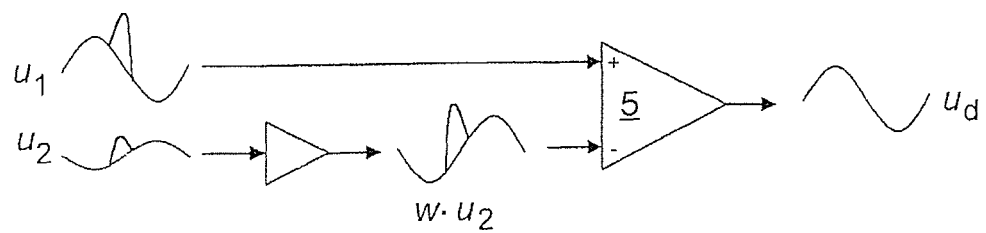
FIG. 4 is a symbolic depiction of the basic idea according to the invention for implementing compensation of the effect of different sensitivities of the first and second sensors.

FIG. 4 shows the basic idea according to the invention for implementing the compensation or at least the reduction of the detrimental effect of different sensitivities of the sensors 2 on the wanted signal voltage $u_d$ and thus on the measured flow, in particular, for same-phase interfering signals. The idea is to multiply one of the two signal voltages $u_1$, $u_2$ ($u_2$ in FIG. 4), with a correction factor w and to select the correction factor w in such a way that the detrimental effect of the different sensitivities on the wanted signal voltage $u_d$ is minimum. In the depicted embodiment, the sensitivity of the second sensor 2b is less than the sensitivity of the first sensor 2a, and thus, the signal voltage $u_2$ of the second sensor 2b is amplified with a factor w that is greater than 1. If the sensitivity of the second sensor 2b was to be higher than the sensitivity of the first sensor 2a, the factor w would be less than 1.

Of course, it is also possible, in addition, to amplify (v>1) or to damp (v<1) the signal voltage $u_1$ of the first sensor 2a with a correction factor v.

Figure 6:
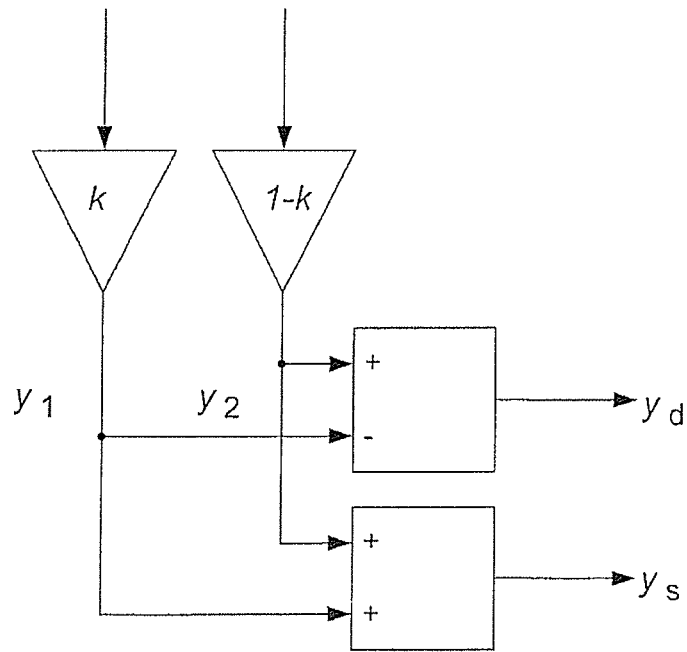
FIG. 6 shows an embodiment, depicted as a block diagram, of the determination according to the invention of a wanted signal and a sum signal from digitized voltage signals.

The method according to the invention for finding the optimum correction factor w is based on the surprising property that the detrimental effect of different sensitivities on the wanted signal voltage $u_d = u_1 - w u_2$ is then minimum, even if the correlation between the wanted signal voltage $u_d$ and a sum signal voltage $u_s = u_1 + w u_2$ is minimum. In FIG. 6, a block diagram illustrates the method according to the invention for determining a wanted signal $y_d$ and a sum signal $y_s$. The signals $x_1$, $x_2$ are the digitized signal voltages $u_1$, $u_2$. By multiplication of $x_1$ with a correction factor v=k, a first signal $y_1$ is produced and by multiplication of $x_2$ with the correction factor w=(1−k), a second signal $y_2$ is produced. The wanted signal is $y_d = y_2 - y_1 = (1-k)x_2 - kx_1$ and the sum signal is $y_s = y_2 + y_1 = (1-k)x_2 + kx_1$. The advantage of using correction factors k and (1−k) is that, as a range for k, the closed interval [0, 1] is adequate.

Figure 5:
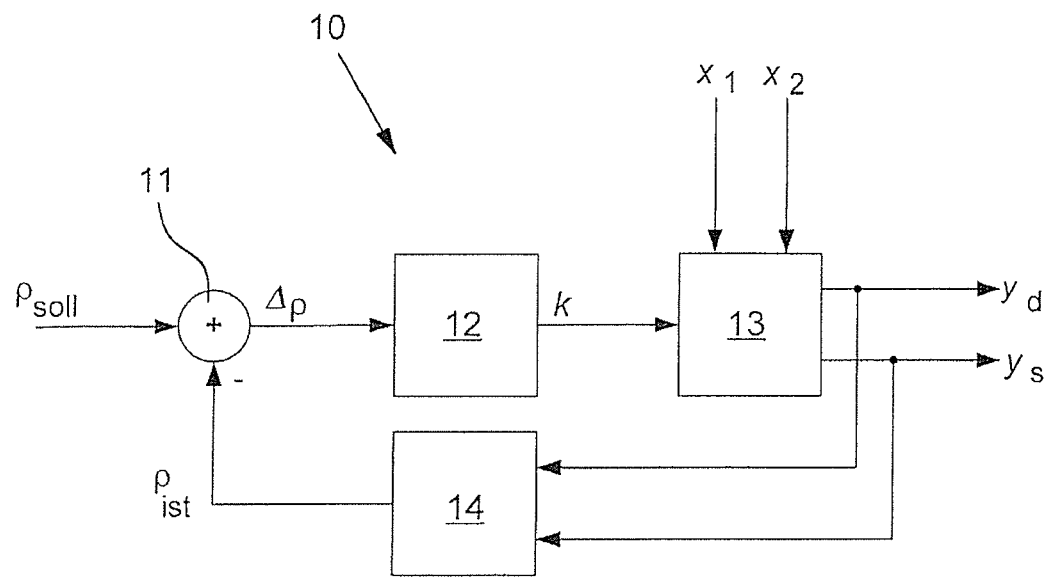
FIG. 5 shows an embodiment, depicted as a block diagram, of the control circuit according to the invention having the functionality shown in FIG. 6.

FIG. 5 shows a closed loop controller 10 as an embodiment of the implementation of the method for finding the optimum correction factor k. The closed loop controller 10 comprises a difference calculator 11, a proportional-integral (PI) controller 12, a signal calculator 13, and a correlation calculator 14. The signal calculator 13 calculates the wanted signal $y_d$ and the sum signal $y_s$, corresponding to the method that is shown in FIG. 6, from the signals $x_1$, $x_2$. The correlation calculator 14 calculates the actual correlation factor $\rho_{actual}$ between the wanted signal $y_d$ and the sum signal $y_s$. The target correlation factor $\rho_{target}$ is zero, i.e., there is no correlation, and the deviation of the actual correlation factor $\rho_{actual}$ from the target correlation factor $\rho_{target}$ is the system deviation $\Delta\rho = \rho_{target} - \rho_{actual}$. The actual correlation factor is calculated according to $$\rho_{ist}[n] = \frac{Y_{ds}[n]}{\sqrt{Y_d[n]Y_s[n]}}$$

with $$Y_{ds}[n] = (1-c)Y_{ds}[n-1] + c y_d[n]y_s[n],$$

$$Y_d[n] = (1-c)Y_d[n-1] + c y_d^2[n],$$

and $$Y_s[n] = (1-c)Y_s[n-1] + c y_s^2[n],$$

where c is a time constant. The system deviation $\Delta\rho$ is the initial value of the PI controller, which varies the correction factor k. The regulating process is terminated when the correlation between wanted signal $y_d$ and sum signal $y_s$ is reduced to a minimum.

Figure 8:
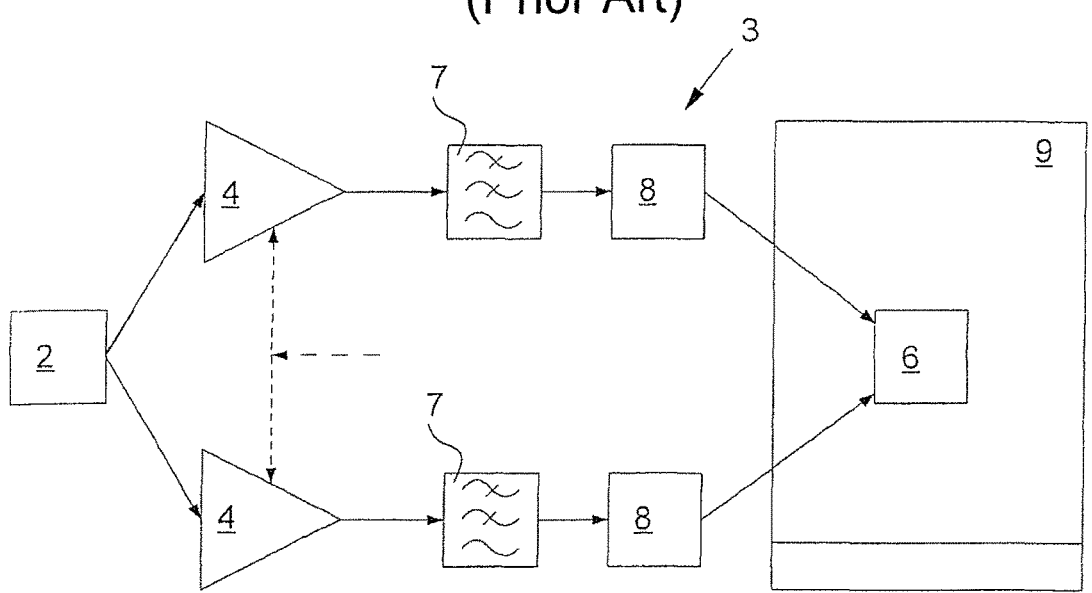
FIG. 8 shows an embodiment, depicted as a block diagram, of the signal processing according to the invention, which comprises the functionality shown in FIG. 5.

FIG. 8 shows a block diagram of a signal processing device 3 according to the invention. The charges $q_1$, $q_2$ that are generated by the piezoelectric sensors 2 are converted by the charge amplifier 4 into voltages $u_1$, $u_2$ that are proportional to the charges $q_1$, $q_2$. Before the digitization of the signal voltages $u_1$, $u_2$ in the analog-digital converter 6 with two signal voltage inputs, the signal voltages $u_1$, $u_2$ are first conditioned. This includes, on the one hand, the filtering of the signal voltages $u_1$, $u_2$ in the low-pass filters 7 to avoid alias effects, and on the other hand, the setting of zero-point voltages of sensors for the best possible use of the modulation range of the analog-digital converter 6 in the preloading devices 8. In contrast to the signal processing device 3 that is known from the state of the art and is shown in FIG. 7, a linkage of the signals of the two sensors is carried out only after the analog-digital conversion in the signal processing 3 that is shown in FIG. 8. In this way, the signals can be linked with one another as desired and further processed. In the microcontroller 9, both the calculation of the wanted signal $y_d$ and the sum signal $y_s$, as explained in FIG. 6, as well as the control circuit 10 are implemented.

What is claimed is:

1. Method for operating a vortex flowmeter device for measuring the flow of a fluid that flows through a measuring tube in which at least one baffle is arranged for producing eddies in the fluid using at least one first sensor and at least one second sensor for measuring pressure fluctuations in the fluid that accompany eddies formed by the at least one baffle, and using a signal-processing device for processing signals $x_1$ of the at least one first sensor which include a first interfering signal and the signals $x_2$ of the at least one second sensor which include an independent second interfering signal, whereby the signals $x_1$ of the first sensor produced by the pressure fluctuations are in anti-phase opposition to the signals $x_2$ of the second sensor produced by the pressure fluctuations, comprising the steps of:

configuring and arranging the first and second sensors relative to the baffle in such a way that a polarity of a charge that results from a force along the y-axis on the first sensor is opposite to a polarity of a charge that results from a force on the second sensor independent of said first and second interfering signals, directing a flow of a fluid through the measuring tube of the vortex flowmeter device being operated and around the at least one baffle, obtaining a first signal $y_1$ by multiplication of the signal $x_1$ of the at least one first sensor with a correction factor v, and obtaining a second signal $y_2$ by multiplication of the signal $x_2$ of the at least one second sensor with a correction factor w, forming a difference between the first signal $y_1$ and the second signal $y_2$ as a wanted signal $y_d$, representing the flow and forming a sum signal $y_s$ from a sum of the first signal $y_1$ and the second signal $y_2$, determining a correlation between the wanted signal $y_d$ and the sum signal $y_s$, and minimizing the correlation by variation of the correction factors v and w, the minimum correlation indicating a minimum content of same-phase interfering signals in the wanted signal $y_d$, whereby same-phase interfering signals superimposed on the anti-phase sensor signals are at least minimized and a measurement representing the flow of a fluid that flows through a measuring tube obtained, outputting a measurement of said flow through the measuring tube that reflects adjustment of the signals from said sensor resulting from said obtaining, forming, determining and minimizing steps.

2. Method according to claim 1, wherein one of the correction factors is 1 and the other of the correction factors is varied.

3. Method according to claim 1, wherein k is a correction factor from a closed interval [0; 1], and v=k and w=1−k.

4. Method according to claim 1, wherein a correlation is determined in time-discrete signal processing for an nth measurement by the correlation factor $$\rho[n] = \frac{Y_{ds}[n]}{\sqrt{Y_d[n]Y_s[n]}},$$

with $$Y_{ds}[n] = \sum_{i=1}^{n} y_d[i]y_s[i],$$

$$Y_d[n] = \sum_{i=1}^{n} y_d^2[i]$$

and $$Y_s[n] = \sum_{i=1}^{n} y_s^2[i].$$

5. Method according to claim 1, wherein the minimum correlation is determined by a closed loop controller, and the closed loop controller comprises a difference calculator, a controller a signal calculator, and a correlation calculator, wherein the difference calculator forms an error from a non-correlation specified as a target correlation and an actual correlation wherein the error is a reference value of the controller, wherein at least one correction factor that is varied by the is a control value, wherein the signal calculator forms the wanted signal $y_d$ and the sum signal $y_s$, and wherein the correlation calculator forms the actual correlation between the wanted signal $y_d$ and the sum signal $y_s$.

6. Method according to claim 5, wherein the controller comprises a proportional-integral regulator.

7. Method according to claim 1, wherein the first and second sensors have different sensitivities which are compensated for by said multiplication of the signal $x_1$ of the first sensor with the correction factor v and by multiplication of the signal $x_2$ of the second sensor with the correction factor w.

8. Vortex flowmeter device for measuring the flow of a fluid that flows through a measuring tube having at least one baffle arranged in the measuring tube for producing eddies in the fluid, comprising:

at least one first sensor for measuring the pressure fluctuations in the fluid that accompany the eddies and producing measurement signals $x_1$, at least one second sensor for measuring the pressure fluctuations in the fluid that accompany the eddies and producing measurement signals $x_2$ in anti-phase to the signals $x_1$, and a signal-processing device for processing signals $x_1$ of the at least one first sensor which include a first interfering signal and signals $x_2$ of the at least one second sensor which include a second interfering signal, wherein the first and second sensors are configured and arranged relative to the baffle in such a way that a polarity of a charge that results from a force along the y-axis on the first sensor is opposite to a polarity of a charge that results from a force on the second sensor independent of said first and second interfering signals, wherein the signal-processing device is adapted for producing a wanted signal $y_d$ representative of the flow from a difference between a first signal $y_1$ derived from the signal $x_1$ and a second signal $y_2$ derived from the signal $x_2$, and forming a sum signal $y_s$ from a sum of the first signal $y_1$ and the second signal $y_2$, whereby same-phase interfering signals superimposed on anti-phase sensor signals are eliminated, wherein the signal processing system is set up in such a way that:

a first signal $y_1$ is obtained by multiplication of the signal $x_1$ of the at least one first sensor with a correction factor v, and obtaining a second signal $y_2$ by multiplication of the signal $x_2$ of the at least one second sensor with a correction factor w, forming a difference between the first signal $y_1$ and the second signal $y_2$ as a wanted signal $y_d$, representing the flow and forming a sum signal $y_s$ from a sum of the first signal $y_1$ and the second signal $y_2$, a correlation between the wanted signal $y_d$ and the sum signal $y_s$, is determined and the correlation is minimized by variation of the correction factors v and w, the minimum correlation indicating a minimum content of same-phase interfering signals in the wanted signal $y_d$, and means for at least minimizing same-phase interfering signals superimposed on the anti-phase sensor signals so as to obtain a corrected measurement representing the flow of a fluid that flows through a measuring tube.

9. Vortex flowmeter device according to claim 8, further comprising an A/D convertor for converting the signal of each sensor individually from analog to digital.

10. Vortex flowmeter device according to claim 8, wherein the first and second sensors have different sensitivities.

* * * * *